Oct. 26, 1926. 1,604,505

T. L. VALERIUS ET AL
HYDRAULIC CAN WASHER AND DRIER
Filed Jan. 5, 1920 6 Sheets-Sheet 3

Inventors
T. L. Valerius
O. Larsen

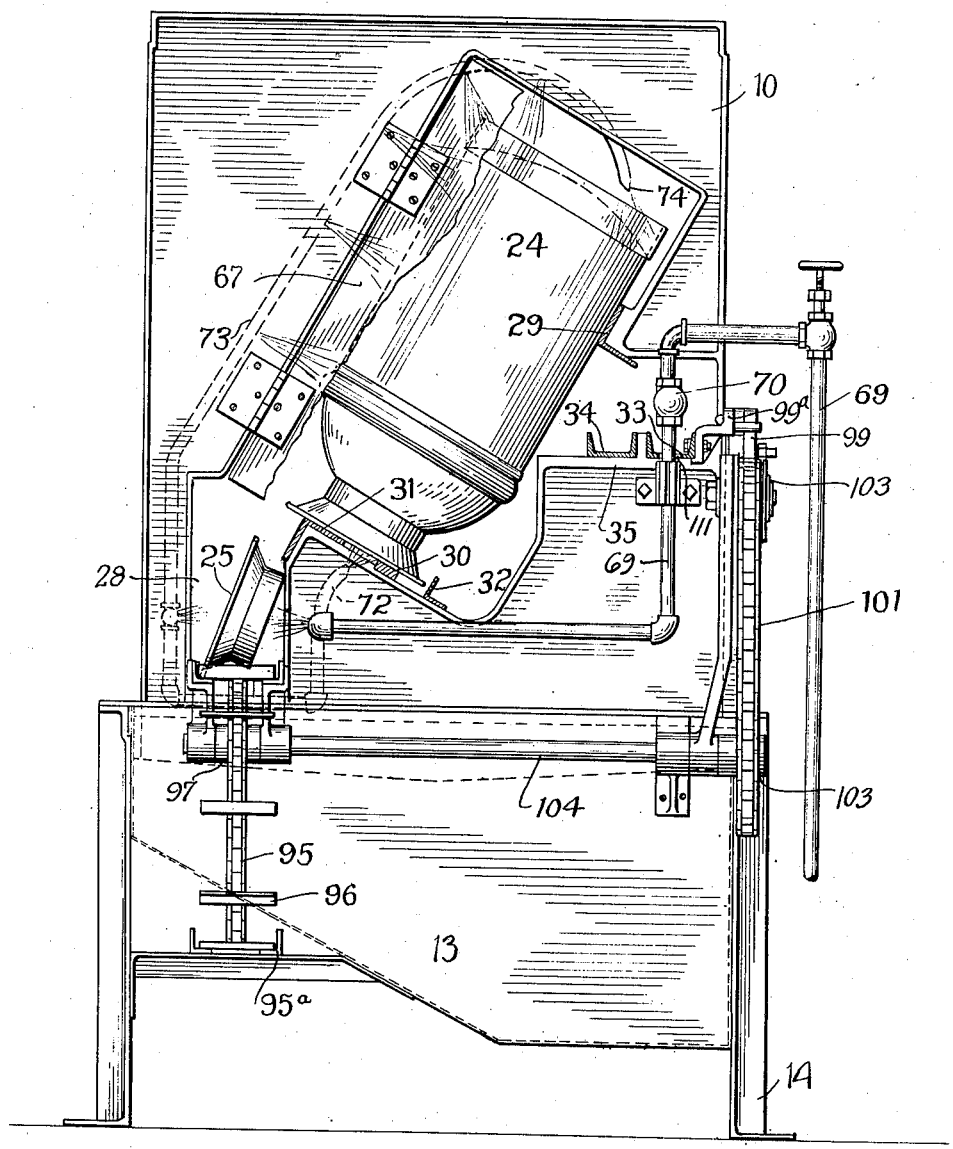

Oct. 26, 1926. 1,604,505
T. L. VALERIUS ET AL
HYDRAULIC CAN WASHER AND DRIER
Filed Jan. 5, 1920  6 Sheets-Sheet 5

Inventors
T. L. Valerius
O. Larsen
By Miller Chridahl & Parker
Attys

Oct. 26, 1926.  
T. L. VALERIUS ET AL  
1,604,505  
HYDRAULIC CAN WASHER AND DRIER  
Filed Jan. 5, 1920   6 Sheets-Sheet 6

Inventors  
T. L. Valerius  
O. Larsen  
By Miller Chadwick & Parker  
Attys

Patented Oct. 26, 1926.

1,604,505

UNITED STATES PATENT OFFICE.

THEODORE L. VALERIUS AND OLAF LARSEN, OF FORT ATKINSON, WISCONSIN, ASSIGNORS TO THE CREAMERY PACKAGE MFG. COMPANY, OF CHICAGO, ILLINOIS, A CORPORATION OF ILLINOIS.

HYDRAULIC CAN WASHER AND DRIER.

Application filed January 5, 1920. Serial No. 349,499.

Our invention relates to the art of cleaning milk cans and the like and more specifically to an improved device adapted to receive the milk cans and automatically perform the entire cleansing operation and deliver the cleaned cans.

The general object of the invention is to cleanse the cans and covers thoroughly at a considerable rate of speed.

Another object is to dry the cans and covers after they have been washed, rinsed and sterilized.

Special objects are to carry the cans in a position such that they will not collect and carry with them the water used in cleaning; to provide means for blowing off any water that has collected; to provide means for preventing splashing from one part of the apparatus to another which would result in contaminating the cleaning fluids employed and to provide automatic means for delivering the cleaned cans to a conveyor or other receiving device.

Further objects and advantages of our invention will become apparent as the description proceeds.

This application is a continuation in part of our copending application Serial No. 307,821, filed June 30, 1919.

Figure 1:
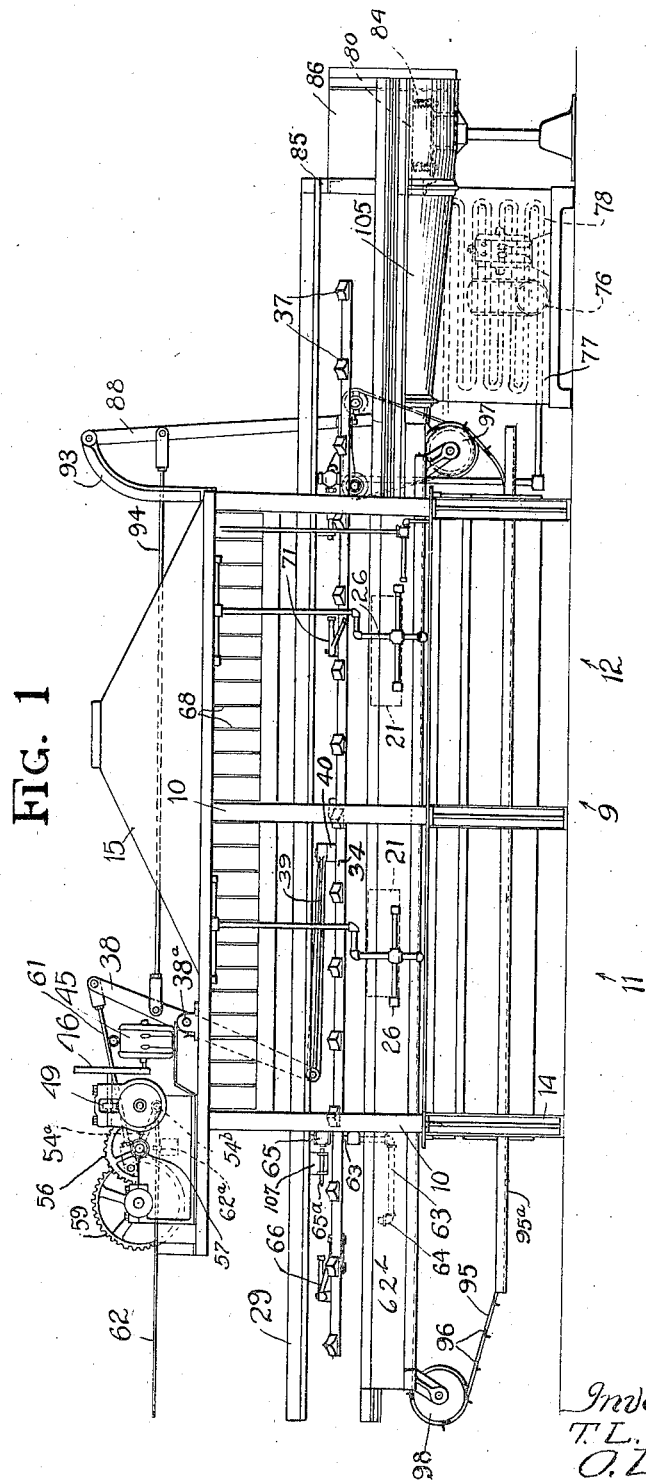
Figure 2:
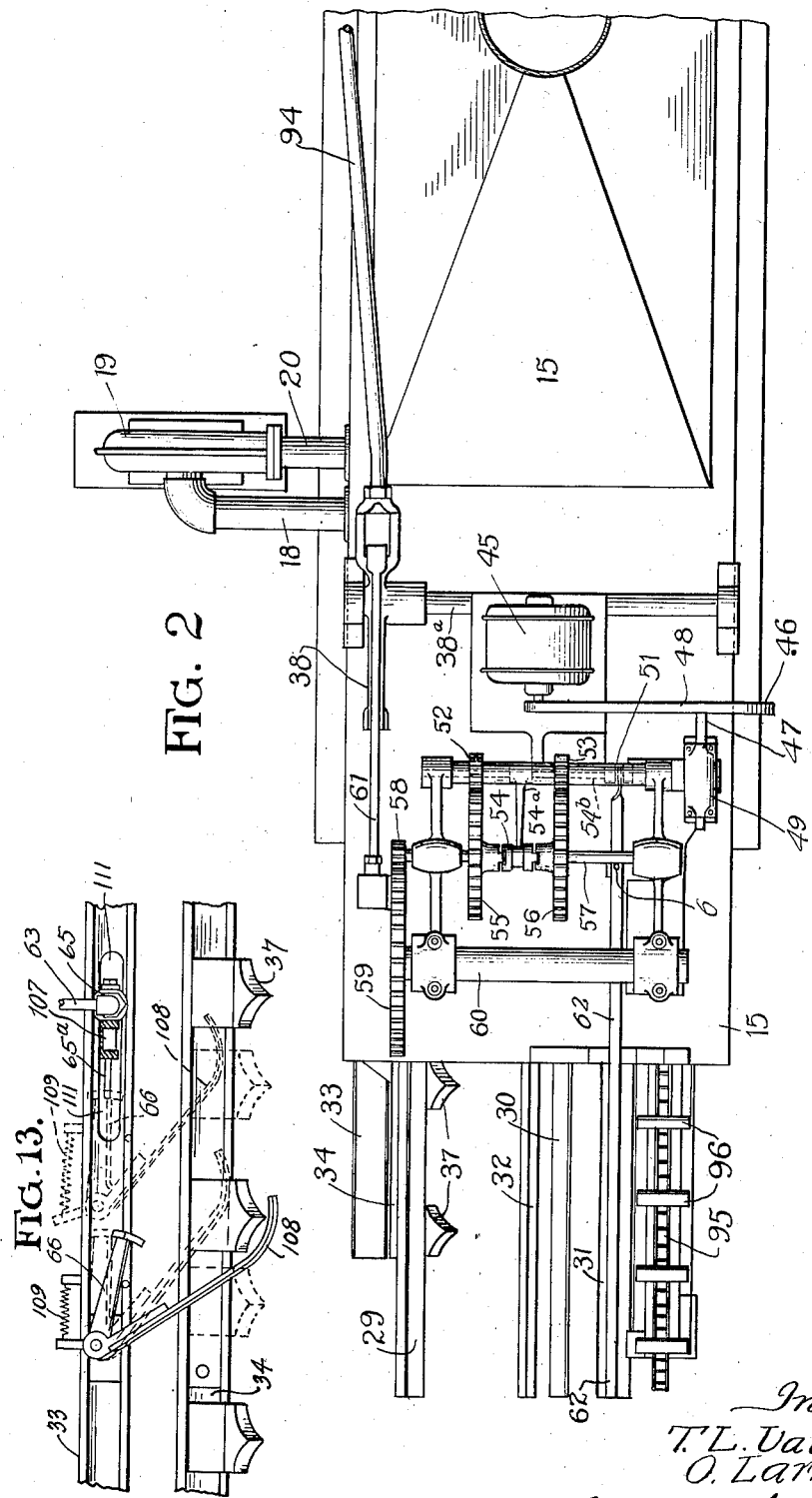
Figure 3:
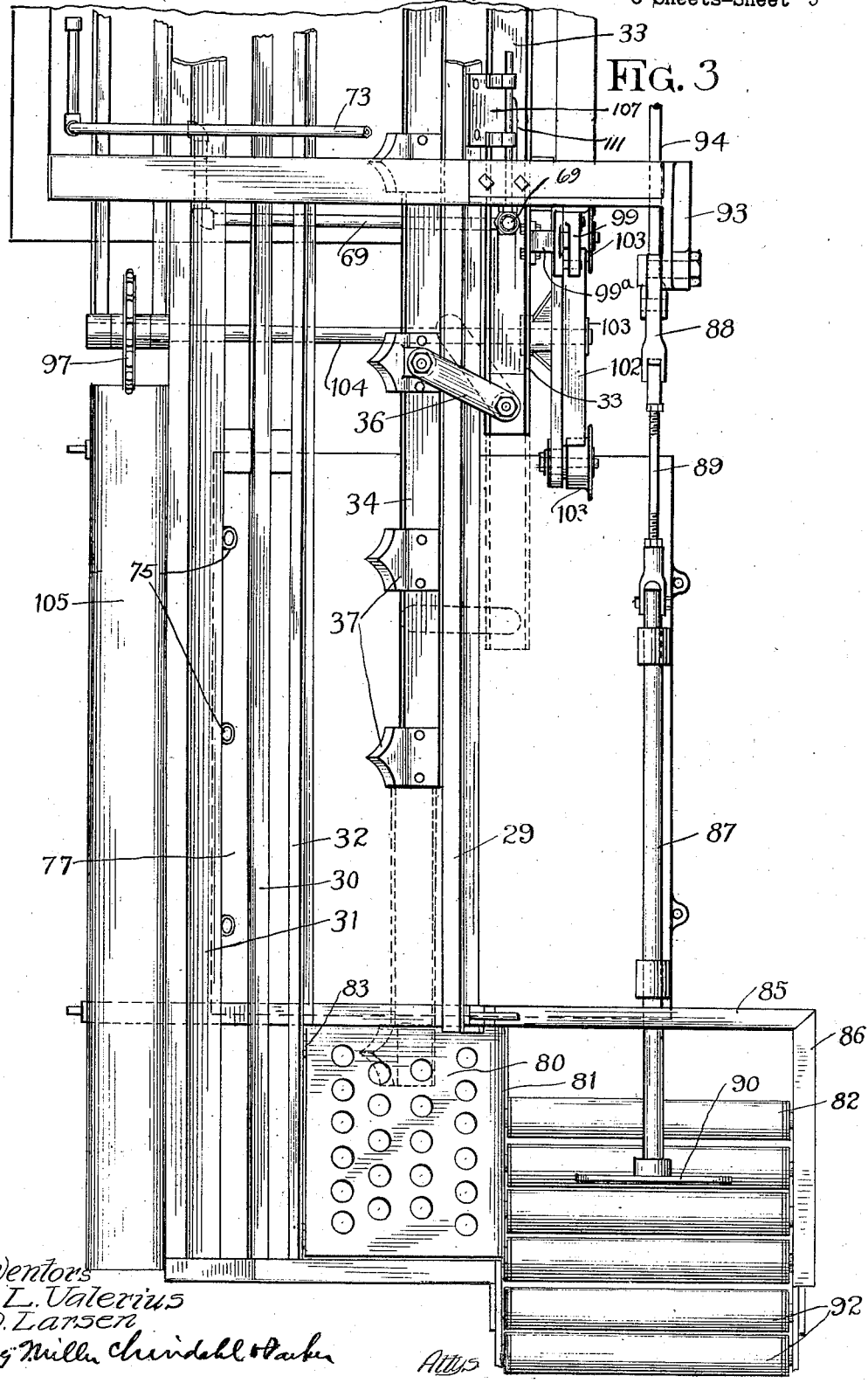
Figure 12:
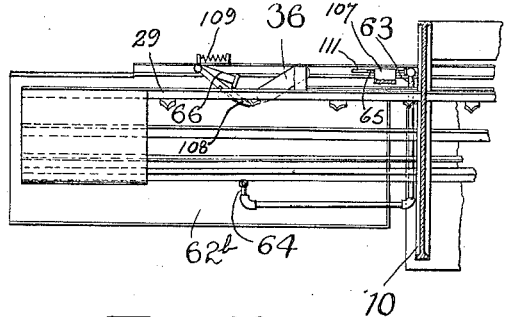
Figure 5:
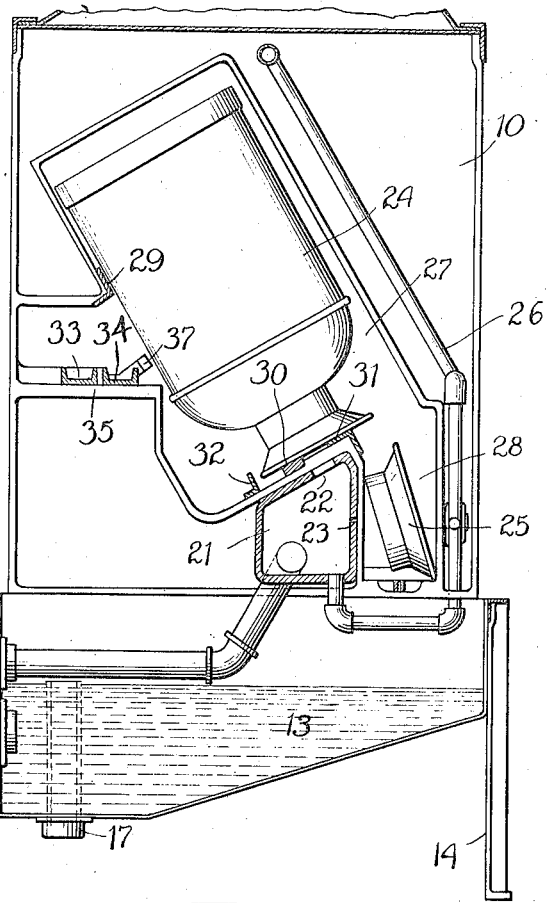
Figure 10:
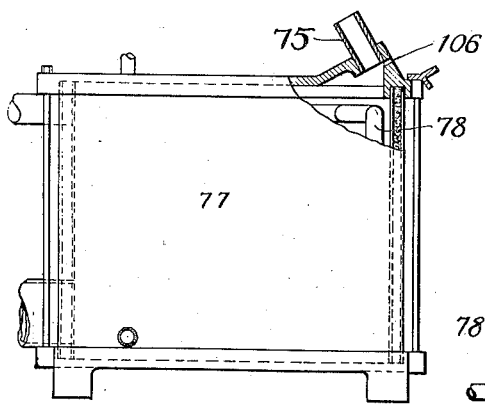
Figure 11:
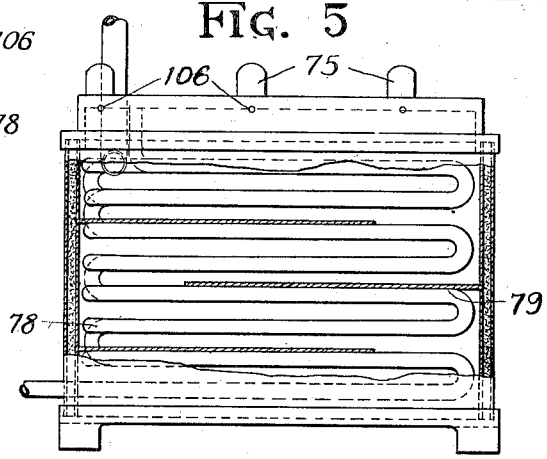
Figure 6:
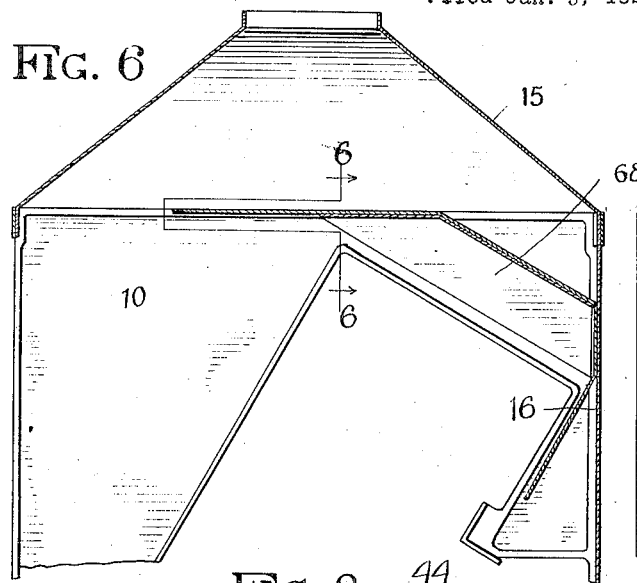
Figure 7:
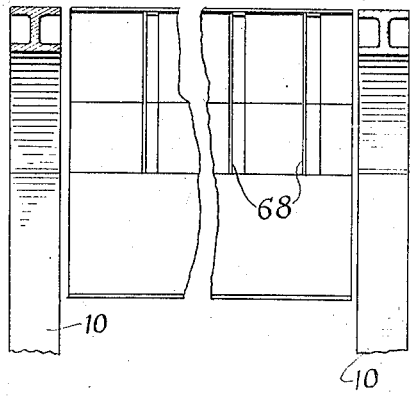
Figure 8:
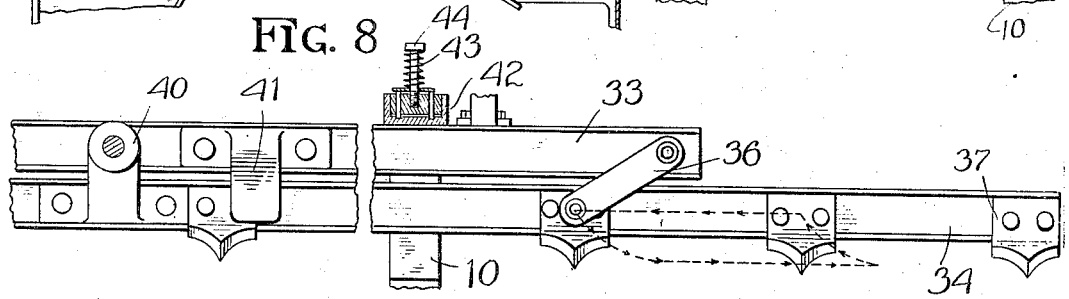
Figure 9:
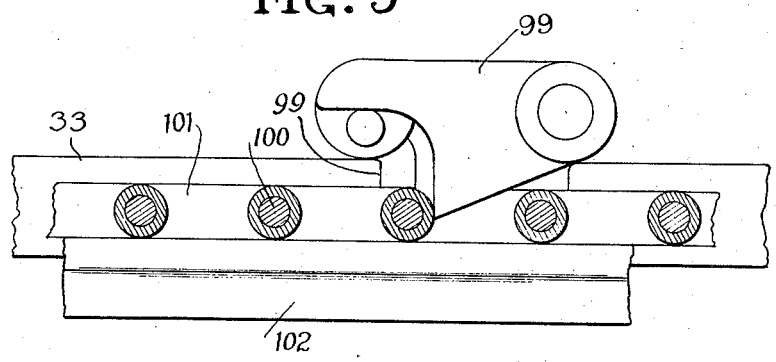

In the accompanying drawings Figure 1 is a front elevation of an illustrative device in which the principles of our invention have been embodied. Fig. 2 is a plan view somewhat enlarged of the receiving end of the machine. Fig. 3 is a similar view of the delivery end of the machine. Fig. 4 is an end view of the apparatus with the drying device and delivery means omitted. Fig. 5 is a transverse section illustrating the construction employed in the cleansing and rinsing compartments. Fig. 6 is a transverse section illustrating the construction and application of our improved baffle plate. Fig. 7 is a fragmentary view showing the baffle plates in front elevation. Fig. 8 is a detail view showing the mounting of the forwarding arms. Fig. 9 is a detail view showing part of the connections for actuating the belt for conveying the covers. Fig. 10 is an end elevation and Fig. 11 a front view of the drier. Fig. 12 is a detail plan view of the receiving end of the machine with the motor and the carrying platform for it removed. Fig. 13 is a fragmentary plan view of the forwarding bars illustrating the can operated valve control means.

In the device we have selected for illustrating the principles of our invention we have shown means for receiving the cans in an inverted position inclined to the vertical and while they are in this position performing a series of cleansing operations thereon. The series of operations illustrated comprises a preliminary rinsing with cold water, a spray bath in cleansing solution, a spray bath in rinsing solution, a sterilizing steam bath and a sterilizing and drying hot air bath.

At the end of this series of operations the cans are turned right side up and automatically delivered by the machine to any suitable receiving device. Auxiliary means are provided for simultaneously performing the same series of operations on the can covers and delivering them at the discharge end of the machine.

While the invention is herein shown as embodied in a machine for treating cans of the well known type used for shipment of milk and cream, it will be understood that the invention may be applicable to the handling of other containers of various shapes and sizes.

Referring more particularly to Figures 1, 4 and 5, the main body 9 of the device shown comprises three partitions 10 defining a cleansing compartment 11 and a rinsing and steaming compartment 12. In the lower portion of each compartment is a tank or reservoir 13 and the entire structure is supported on legs 14. A deck or roof frame 15 covers the top of the main body of the machine and provides a support for part of the power equipment. The rear wall 16 (see Fig. 6) may be permanently mounted on the partitions 10 or it may be composed of a plurality of detachable panels. The front of the body 9 is preferably enclosed by detachable panels (not shown).

The tanks 13 each contain an overflow pipe 17 and are equipped with connections 18 (see Fig. 5) to a suitable pump 19 which withdraws the fluid from the reservoir 13 and delivers it through a pipe 20 to a header 21. The header 21 may be apertured at 22 and 23 to discharge fluid into the can 24 and against the can cover 25. We provide additional spraying means in the nature of pipes 26 communicating with the headers and extending as illustrated in Fig. 1 up in front of the covers 25 and cans 24. These pipes are provided with a considerable number of small holes adapted to discharge fluid against the cans and covers. The pumps 19 operate continuously so that there is an uninterrupted discharge of cleansing or rinsing fluid, as the case may be, through which the cans must pass. Any suitable means (not shown) may be provided for keeping the tanks filled with fluids at the desired temperatures.

Means are provided for passing cans in an inverted position inclined to the vertical, as indicated in Figs. 4 and 5 from one end of the apparatus to another with an intermittent motion, allowing each can to pause for a proper length of time in a position to be acted on by each of the series of cleansing, sterilizing and drying devices. The partitions 10 are each cut away as indicated in Figs. 4, 5 and 6 to provide a passageway 27 for the cans and a small passage-way 28 for the covers. Suitable tracks, such, for instance, as the angle bar 29 supporting the body of the can, the bars 30 and 31 carrying the weight of the can by engagement with its open mouth and an additional guide rail 32 are provided.

The means for intermittently moving cans along these tracks comprises a pair of forwarding bars 33 and 34. The rear forwarding bar 33 reciprocates on ledges 35 formed in the partitions 10 and the front bar 34 is connected to the rear bar by short links 36 and may reciprocate longitudinally on the ledges 35 and also slide out transversely to engage the cans 24 between suitable projecting teeth 37. The front bar 34 preferably moves forward from the position shown in Fig. 5 far enough to just lift the cans clear of the rail 29 so that the cans do not slide in contact with the rail.

Power is transmitted to the front forwarding bar 34 through a drag link 39 (see Fig. 1) from a slowly rocking pitman 38 pivoted on a shaft 38ª. In Fig. 8 the parts are illustrated at the beginning of the stroke, the drag link being pivotally connected to a lug 40 on the bar 34. The path of movement of the front bar is indicated diagrammatically in dotted lines in Fig. 8. The initial forward movement of the link 39 will slide the front bar 34 forward to engage the cans, the links 36 rotating around their pivotal mountings on the rear bar 33, which remains stationary. When the links have swung out approximately perpendicular to the bar 33 the lug 40 encounters a stop lug 41 on the rear bar and the two bars 33 and 34 move longitudinally together throughout the remainder of the forwarding stroke. At the beginning of the return stroke the front bar is collapsed against the rear bar after which the links 36 force both the front and rear bars to return together to the initial position.

The mechanism last described imparts an intermittent forward movement to the cans passing through the machine. During their periods of rest, the cans are supported as illustrated in Fig. 5, the mouths of the cans resting upon the bars 30 and 31 and the inclined bodies of the cans resting laterally upon the rail 29. While the cans are in such position, the bar 34 is moving reversely and is drawn laterally out of contact with the cans by the links 36 secured to the linearly moving bar 33. By the latter means, the return stroke of the forwarding bar 34 is made entirely free of the cans as the latter rest upon their stationary supports. At the beginning of its forward stroke the bar 34 is swung laterally toward the cans by the links 36, which describe a path illustrated in Fig. 8, the bar 34 making contact with the inclined can bodies and tipping them laterally away from the rail 29. The continued forward movement of the bar 34 carries forward the cans, then supported laterally between the projecting teeth 37, until the bar 34 reaches the limit of its forward movement and begins its reverse movement, whereupon the cans are again dropped back upon the rail 29, where they remain at rest during the return movement of the bar 34.

To insure that the rear bar will not slide until the transverse shifting of the front bar by rotation of the links 36 is completed, we may provide suitable friction means in the nature of a shoe 42 rubbing against the rear side of the rear bar and adjustably and resiliently pressed against the bar by means including a spring 43 tensioned by an adjustable bolt 44.

Any suitable or preferred source of power may be employed to actuate the pitman 38. We have illustrated an electric motor 45 driving the wheel 46 at the end of a shaft 47 through a suitable belt or sprocket chain 48.

The shaft 47 is journaled in the casing 49, which houses a conventional worm and spiral gear transmission by which power is transmitted from shaft 47 to a transverse shaft 51. The shaft 51 carries a pair of rigidly mounted pinions 52 and 53 of different diameters to provide two speeds for the operation of the machine. The gears 52 and 53 are in constant mesh with a pair of gears 55 and 56 respectively, the latter being rotatably mounted on a shaft 57. A clutch member 54, splined on the shaft 57 is selectively operable into engagement with cooperative clutch elements formed on the hubs of the respective gears 55 and 56. The clutch member 54 is operated by a shifting finger 54ª engaging an annular recess in the member 54 and supported on a longitudinally slidable bar 54$^b$. A hand lever 62, extending to a readily accessible point at the receiving end of the machine, is pivoted at 62$^a$ and is operatively connected at its inner end with the slidable bar 54$^b$. The shaft 57 also carries a rigidly mounted pinion 58, meshing with a gear 59 mounted on a shaft 60. The gear 59 is provided with a crank pin to which is operatively connected one end of a drag link 61 having its opposite end operatively connected to the upper end of the pitman 38.

Referring more particularly to Fig. 12 showing the receiving end of the machine in plan view with the roof 15 removed, the cans are placed in inverted position on the end of the tracks, which preferably extend to or near the milk-receiving station. Before they reach the first partition 10 there will be time for most of the milk to drain out of them. A suitable drain table 62$^b$ may be employed to catch the milk falling from the cans. Means are provided for spraying a moderate amount of cold water into each can while over the drain table 62$^b$ to wash away most of the milk adhering to the walls of the can and prevent a rapid contamination of the cleansing solution in compartment 11.

We have illustrated in Figs. 1, 12 and 13 a water pipe 63 terminating at its lower end in a suitable upwardly directed nozzle 64. The pipe 63 extends upwardly through a slot 111 in the reciprocating bar 33 and therefrom to a suitable supply of cold water. A quick acting valve 65, positioned in the pipe 63 just above the bar 33, controls the discharge of rinsing water from the nozzle 64. The valve 65 is provided with a longitudinally operable operating rod 65$^a$, extending parallel to the bar 33, and supported in a guide bracket 107 depending from the fixed track rail 29. The rod 65$^a$ is operatively engaged by a swinging finger 66 pivotally mounted on the bar 33 and normally held out of engaging alinement with the rod 65$^a$ by a spring 109 attached to the finger and to the bar 33. The finger 66 is provided with an arm 108 rigidly secured thereto and extending laterally over the can contacting bar 34 in position to be engaged and swung aside by a can being moved toward the nozzle 64. The presence of a can in contact with the arm 108 operates to swing the finger 66 into alinement with the rod 65$^a$ so that the latter is engaged by the finger at the end of the forward movement of the bar 33, and the valve 65 is opened as the can reaches position over the nozzle 64. With the reverse movement of the bar 33, the finger 66 is disengaged and the arm 108 is withdrawn from contact with the can, whereby the finger is swung out of engaging alinement and the valve 65 remains closed during the further reciprocatory movement of the bar 33 until another can is placed in position on the forwarding bars.

Continued operation of the machine will carry the can through the first partition 10 into the cleansing compartment. Each of the partitions 10 is preferably equipped with a hinged door 67 (see Fig. 4) which may be pushed aside by the cans as they pass through and will fall back into position by gravity. These doors prevent splashing of the fluid spray in each compartment into the other compartment or out of the machine, and as the compartments contain hot water and are ordinarily full of steam or vapor when in operation, the doors prevent loss of heat by too free a circulation of air. As each can is moved into position over the header 21 and opposite the pipes 26 it is sprayed practically over its entire surface and then allowed to remain for a short time with the header 21 discharging cleansing fluid into it. As it is then moved out of the spray, it is again thoroughly washed on the outside. From the cleansing compartment the can passes into the rinsing and steaming compartment 12 and is subjected first to an operation substantially identical with that in the cleansing compartment except that the fluid used is clean hot water.

To further prevent splashing from one compartment to another, especially while the cans are passing through the doors, by the action of the headers and pipes which throw large amounts of fluid with considerable force, we provide a series of baffle plates 68 (see Figs. 1 and 6) extending in transverse planes downward from the upper rear corner of the compartment to just allow the cans to pass by them. Water thrown violently upward or sideways will strike the top and rear walls between these plates and subsequently fall out of the pockets formed by the plates back into the compartment or tank from which the water was taken.

After the rinsing operation the cans are subjected to the sterilizing action of steam. For this purpose we provide a steam pipe 69 (see Fig. 4) having a valve 70 controlled automatically by engagement of the cans with the finger 71 (see Fig. 1) which is a duplicate of finger 66. As each can pauses in contact with the finger 71 during the first portion of the return stroke of the forwarding bars steam is discharged through a nozzle 72 into the interior of the can and from a plurality of nozzles in a pipe 73 extending up beside the can and curved over the bottom thereof as clearly indicated in Fig. 4. The jet of steam from the nozzle 74 at the end of the pipe 73 will enter the pocket in the bottom of the can which is the only place where water will be retained by the can, due to its angular position, and blow or splash off the can practically all the water accumulated at this point.

After passing out of the rinsing and steaming compartment 12 each can makes a plurality of stops over nozzles 75 (see Fig. 10) through which hot air is blown by a suitable fan 76 (see Fig. 1). The heating compartment 77 may contain steam pipes 78 and a plurality of baffles 79 to direct the air through a circuitous path before it is discharged from the nozzles 75. The steam pipe 69 may economically be connected to the discharge end of the heating pipes 78 and when the device is in continuous operation the steam bath given each can will begin with a small discharge of very hot water of condensation.

After passing over the drying jets 75, the can is inverted and delivered right side up upon a conveyor. The track rail 29, which laterally supports the bodies of the inclined cans, terminates short of the ends of the undersupporting track rails 30, 31 and 32, (see Fig. 3). As each can is pushed past the end of the track 29 by the last tooth 37 on the forwarding bar 34, its inclined position causes it to fall laterally, pivoting on the rim of the can mouth which is still supported by the guide rail 32. As the body of the can falls, it strikes upon a resiliently supported horizontal shelf 80, the outer edge 81 of the shelf being positioned to receive the can inwardly of its center of gravity, so that the heavier bottom end of the falling can causes it to swing over the shelf edge 81 and drop in upright position upon a set of rollers 82 positioned at a level below that of the shelf 80. Suitable side walls 85 and 86 form a partial enclosure into which the can is thus allowed to fall. The shelf 80 is herein shown as pivotally secured at its inner edge to the guide rail 32 by hinges 83, the outer portion of the shelf being supported from beneath by springs 84, (indicated in Fig. 1).

Pusher rod 87 is connected to the lower end of a rocking arm 88 by a suitable link 89 and carries a pusher plate 90 which operates during the return stroke of the forwarding arms to push the can last dropped into the inverter off the rollers 82 from which it may roll down an inclined track or discharge chute, preferably equipped with rollers, the first two of which are indicated at 92 in Fig. 3. Motion is transmitted to the rocking arm 88, which is pivotally supported at its upper end on a suitable bracket 93 by a link 94 connected to the pitman 38 as indicated in Figs. 1 and 2.

The covers for the cans may, if they are linked to the cans, be carried by the motion of the cans through the small passageway 28 in which they are exposed as indicated in Fig. 5, to the cleansing and rinsing solutions, and as indicated in Fig. 4, to the steam jets, simultaneously with the can. If however, the cover is not attached to the can, we have provided suitable means for moving the cover simultaneously with the motion of the can to subject it simultaneously to the same series of operations.

The mechanical transmission for this is best illustrated in Figs. 1, 2, 4 and 9 and comprises an endless chain or conveyor 95 equipped with a plurality of spaced projecting members which we have illustrated as short sections of angle iron 96 and passing over sprocket wheels 97 and 98 at the two ends of the machine. The projections 96 slide along the bottom of the passage 28 and push the covers with them. A support 95a may be provided to support and guide the lower portion of the conveyor 95. The conveyor 95 is intermittently actuated simultaneously with the movement of the forwarding bars to move the cans, by means of a pivoted dog 99 (see Figs. 3, 4 and 9—the parts being illustrated in Fig. 3 with the chain 101 removed) pivotally supported on a bracket 99a mounted on the rear forwarding bar 33 and adapted during the forward motion of said bar to engage the pins 100 connecting the links of an endless chain 101 and thus to move the chain. A suitable support 102 supports a horizontal run of the chain in position to be properly engaged by the dog 99 during its motion. The chain 101 passes around three triangularly spaced wheels 103 the lower one of which is a sprocket carried by the transverse shaft 104 which at its front end carries the sprocket 97 which drives the conveyor 95.

After passing to the end of the conveyor 95, the covers roll down a slightly inclined chute 105 (Fig. 1), the rear wall of which is formed by the front wall of the heating compartment 77. Suitable orifices 106 (Fig. 11) allow hot air to escape into the trough to dry the covers. The cover will roll down to the end of the chute, which is closed, and may be placed on the can after it is turned right side up in the inverter, by an attendant who inspects the cans to see that they are properly cleaned and sterilized.

It will be seen that we have provided simple and efficient means for performing the series of operations we have selected. While we have described in detail one specific embodiment of the mechanisms necessary for this purpose, it should be clearly understood that the description is only for purposes of illustration and that many modifications and variations will naturally occur to those skilled in the art.

We claim as our invention:

1. A can washer having, in combination, means forming a track to support inverted cans, the mouths of the cans resting upon said track, a track member extending parallel with the other track means against which rest the bodies of the cans, means for spraying the cans internally and exteriorly with a washing fluid, a tank below the track means to receive fluid draining from the cans, means to spray the cans with a rinsing fluid, a tank beneath the track means to receive rinsing fluid draining from the cans, said two spraying means being arranged in series along the path of the can, and means engaging the bodies of the cans to advance them on said track means, said advancing means being arranged to lift the cans clear of the before-mentioned track member.

2. A can washer having, in combination, means forming a track to support inverted cans in inclined position, the mouths of the cans resting upon said track, a track member extending parallel with the other track means against which rest the bodies of the cans, means for spraying the cans internally and exteriorly with a washing fluid, a tank below the track means to receive fluid draining from the inclined cans, means to spray the cans with a rinsing fluid, and a tank beneath the track means to receive rinsing fluid draining from the inclined cans, said two spraying means being arranged in series along the path of the can.

3. A can washer having, in combination, a washing tank, a rinsing tank, a track extending above said tanks for supporting the cans to be washed, means for discharging the cleansing fluid from each of said tanks against said cans, a partition between and above the tanks, said track extending through the partition, the partition having an opening for the passage of cans, and a door on the partition tending to close said opening, said track being arranged to support the cans in inverted and inclined position.

4. An apparatus for cleaning cans having, in combination, a track for supporting cans, a reciprocatory can advancing mechanism extending parallel with said track and having means to engage the individual can bodies, a cleaning jet for discharging cleaning fluid into a can passing along said track, a valve controlling said jet, a valve actuating member pivotally mounted on said can advancing mechanism and a part connected to said member and arranged to be displaced by a can to move said member into position to actuate said valve.

5. In a device of the class described, a practically complete enclosure having end walls, means for passing a series of containers in inverted position inclined to the vertical through said enclosure, and doors in the end walls of said enclosure, said doors being freely pivoted on axes inclined to the vertical and being adapted to swing aside to permit said containers to enter and leave said enclosure and to return by gravity to closed position when not displaced by the passage of said containers, and means for washing the containers during such passage.

6. In a device of the class described, a plurality of jet cleaning devices, and means for passing containers past said jet cleansing devices in an inverted position substantially inclined to the vertical whereby the liquid retained by the inverted bottoms of said receptacles is reduced to a minimum.

7. In a device of the class described, a plurality of jet cleansing devices, means for passing a container past said jet cleansing devices in an inverted position inclined to the vertical whereby the liquid retained by the inverted bottom of said container is reduced to a minimum, and a jet device adapted to deliver gaseous fluid against the bottom of said container after it has passed the liquid operating devices, said gaseous jet being directed into the bottom of said container in which liquid has accumulated, to blow said liquid away.

8. In a device of the class described, tracks adapted to support a series of containers, means for cleaning containers supported on said tracks, a parallel track adapted to support the covers for said containers adjacent the mouths of said containers, said tracks being arranged with an unobstructed passageway therebetween throughout their length for the passage of attachment means securing said covers to said containers, means for moving said containers along said tracks, whereby if said covers are attached to said containers they may be moved in unison with said containers, and means adapted to engage covers not attached to their containers to move them also in unison with their containers.

9. In a device of the class described, a plurality of cleansing and sterilizing devices, a set of tracks adapted to support a series of containers in inverted position, additional tracks adapted to support covers when attached thereto, said container supporting and cover supporting tracks having an unobstructed passageway therebetween over their entire length to permit the passage of cover attaching means, and separate means for simultaneously passing said containers and said covers along said tracks to expose them to the action of said cleansing and sterilizing devices.

10. An apparatus for cleaning cans, having in combination, a can supporting track, a reciprocatory mechanism having means to engage the cans and intermittently move them along said track, a jet for intermittently discharging cleaning fluid into successive cans passing on said track, a valve controlling said jet, a member pivoted on said mechanism and swingable into position to engage and operate said valve with the movement of said mechanism, and an arm mounted in rigid relation to said member adapted to be engaged by a can being moved over said jet and thereby swing said member into position to operate said valve.

11. In a machine of the character described, the combination of means for supporting articles to be treated while traveling through the machine, a reciprocatory conveyor for moving the articles on said supporting means through said machine, a jet device adjacent which the successive articles are positioned to be treated by fluid discharged therefrom, a valve for controlling the discharge of fluid from said jet device, and a unitary device movably mounted on said conveyor and having a portion arranged to operate said valve and another portion arranged to be engaged by an article on said supporting means and to be thereby moved to locate the first mentioned portion in valve-operating position.

12. In a machine of the character described, the combination of means for supporting articles to be treated while traveling through the machine, a reciprocatory conveyor for moving the articles on said supporting means through said machine, a jet device adjacent which the successive articles are positioned to be treated by fluid discharged therefrom, a valve for controlling the discharge of fluid from said jet device, and a movable device carried by said conveyor for actuating said valve by the movement of said conveyor in one direction to open said valve, said movable device engaging the article positioned adjacent said jet device whereby said movable device is shifted to valve actuating position.

13. In a machine of the character described, the combination of means for supporting articles to be treated while traveling through the machine, a reciprocatory conveyor for moving the articles on said supporting means through said machine, a jet device adjacent which the successive articles are positioned to be treated by fluid discharged therefrom, a valve for controlling the discharge of fluid from said jet device, and means for operating said valve including a part movably mounted on said conveyor and arranged to be engaged and moved by the article on said supporting means, said valve-operating means normally occupying an inoperative position but being movable by engagement of an article with said part for moving said valve-operating means into position to actuate said valve.

14. In a machine of the character described, the combination of means for supporting articles to be treated while traveling through the machine, a reciprocatory conveyor for moving the articles on said supporting means through said machine, a jet device adjacent which the successive articles are positioned to be treated by fluid discharged therefrom, a valve for controlling the discharge of fluid from said jet device, a movable device carried by said conveyor and arranged to be engaged and moved by an article on said supporting means, and means arranged to establish an operative connection between said device and said valve for operating the latter when an article is in engagement with said device.

15. In a machine of the character described, in combination, a reciprocatory conveyor arranged to move articles to be treated through the machine, a valve controlling a flow of treating fluid for such articles, and valve operating means mounted on said conveyor movable by such articles into position to effect the opening of said valve.

16. In a machine of the character described, the combination of means for supporting articles to be treated while traveling through the machine, a reciprocatory conveyor for moving the articles on said supporting means through the machine, means for discharging a medium to said articles, a valve controlling the discharge of said medium, an operating member for opening said valve, and a device which is mounted on said reciprocatory conveyor and is shifted by an article in operative relation to said discharge mean to a position for engaging said valve operating member, said device moving said operating member to open said valve during movement of said conveyor in one direction.

17. In a machine of the character described, the combination of means for supporting articles to be treated while traveling through the machine, a reciprocatory conveyor for moving the articles on said supporting means, a jet device adapted to discharge fluid to the articles and over which the successive articles on said supporting means are positioned, a valve controlling the discharge from said jet device, a valve operating member operatively engaging said valve, and a device movably mounted on said conveyor to be shifted to and from a position to engage said valve operating member, said device having a portion engaging an article positioned over said jet device to be shifted by said article to engage said valve operating member.

18. In a machine of the character described, the combination of means for supporting articles to be treated while traveling through the machine, a reciprocatory conveyor for moving the articles on said supporting means, a jet device adapted to discharge fluid to the articles and over which the successive articles on said supporting means are positioned, a valve controlling the discharge from said jet devices, an operating arm for said valve, a device pivoted to said conveyor, said device being normally arranged to engage an article positioned over said jet device and to be moved by said article to a position to engage said valve operating arm during movement of said conveyor in one direction.

19. In a machine of the character described, the combination of means for supporting articles to be treated while traveling through the machine, a reciprocatory conveyor for moving the articles on said supporting means through said machine, a jet device for discharging a medium to articles positioned on said supporting means, a valve for controlling the discharge from said jet device, an operating arm for said valve, a device pivoted to said conveyor to be moved from a normal position wherein it projects in the path of travel of articles on said support to a position wherein it may engage said valve operating arm during movement of said conveyor in one direction, said device having a cam head whereby it is moved by an article on said support to said latter position during said movement of said conveyor.

20. In a machine of the character described, the combination of means for supporting articles to be treated while traveling through the machine, means for supplying a treating medium to articles when positioned at a predetermined place on said supporting means, a reciprocatory conveyor for moving successive articles to be treated to and from said predetermined place on said supporting means, a valve for controlling the supply of the medium to the articles, a valve operating member associated with said valve, and means carried by said conveyor for connecting said conveyor to said valve operating member, said means including a part positioned to engage an article at said predetermined place and to be moved by said article to establish said valve operating connection during movement of said conveyor in one direction.

21. In a machine of the character described, the combination of means for supporting articles to be treated while traveling through the machine, means for discharging a medium to treat articles when positioned at a predetermined place on said supporting means, a conveyor for moving successive articles to and from said predetermined place to be treated by said medium, a valve controlling the discharge of medium from said discharge means, said valve having a stem projecting therefrom, a valve operating member adapted to be pressed against said stem to open said valve, and means carried by said conveyor operable by an article positioned at said predetermined place for engaging said valve operating member to open said valve during one movement of said conveyor.

In testimony whereof we have hereunto set our hands.

THEODORE L. VALERIUS.
OLAF LARSEN.